United States Patent

[11] 3,579,906

| [72] | Inventor | David H. La Forge |
| | | R.R. 1, Box 648, Makawao, Hawaii 96768 |
| [21] | Appl. No. | 886,572 |
| [22] | Filed | Dec. 19, 1969 |
| [45] | Patented | May 25, 1971 |

[54] MINIATURE STEERABLE VEHICLE AND TRACK SYSTEM THEREFOR
30 Claims, 6 Drawing Figs.

[52] U.S. Cl. .................................................. 46/244
[51] Int. Cl. .................................................. A63h 33/26
[50] Field of Search .................................................. 46/201, 202, 243, 244, 221, 210, 211, 213

[56] References Cited
UNITED STATES PATENTS

| 2,570,766 | 10/1951 | Chenault | 46/243UX |
| 3,201,899 | 8/1965 | Toteff et al. | 46/244 |
| 3,246,719 | 4/1966 | Lahr | 46/244X |
| 3,303,607 | 2/1967 | Zalkind | 46/244 |

Primary Examiner—Louis G. Mancene
Assistant Examiner—D. L. Weinhold
Attorney—Christen & Sabol ABSTRACT: A miniature four-wheeled vehicle is provided with a solenoid having a linearly movable armature for turning the steering wheels in response to electrical impulses received by a set of contact brushes on the vehicle which selectively engages the conductive track system on a supporting surface which also supplies power to the vehicle and includes conductive guiding areas on the surface for steering the vehicle through a switch in the track system.

INVENTOR
DAVID H. LA FORGE

BY

ATTORNEYS

INVENTOR
DAVID H. LA FORGE
BY

ATTORNEYS

MINIATURE STEERABLE VEHICLE AND TRACK SYSTEM THEREFOR

This invention relates to electrically powered vehicles of the type popularly known as "slot cars" in which the track system usually includes a series of sections which can be joined together to provide a course for the vehicles to follow, including turns, inclines, switches and crossovers. In these prior art devices the vehicles are guided by a downwardly projecting pin, usually placed near the front of the vehicle, received in a central slot running along the length of all the sections in the course.

A feature of the present invention is the fact that the vehicles do not require a guiding slot and the track need not be constructed in standard sections, but can be laid out on any type of surface upon which a miniature wheeled vehicle will easily roll and the configuration of the course is not limited by any other consideration than the topography and size of the area in question.

Another feature of the invention is the fact that because the usual "slot" is not required, the action of the individual vehicles is entirely dependent for directional control upon the turning, and frictional gripping ability, of each vehicles steering wheels with the result that the movements of the vehicle is entirely realistic.

Still another object of the invention is to provide a steerable miniature vehicle which can be controlled by a simple track system for guiding the vehicle along all portions of the track system, including, straightaways, crossovers, and switches.

Figure 1:
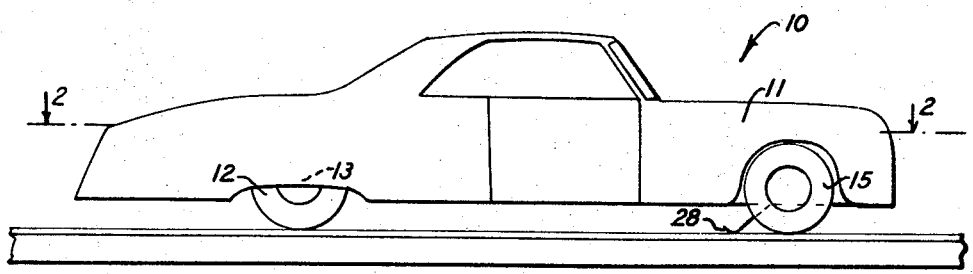
Figure 5:
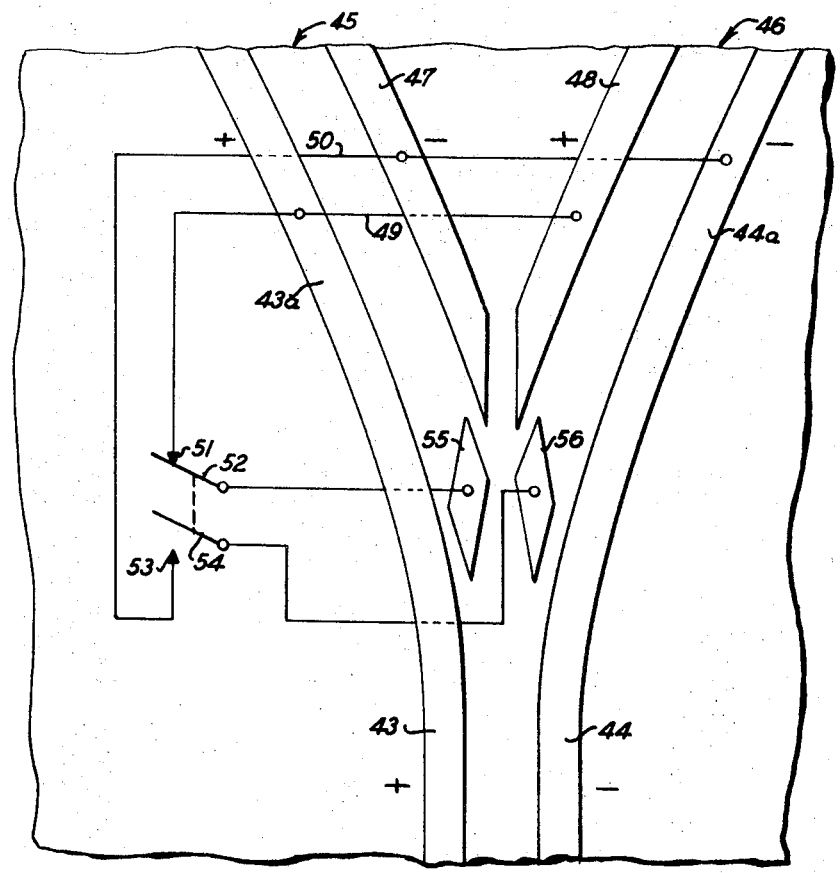
Figure 2:
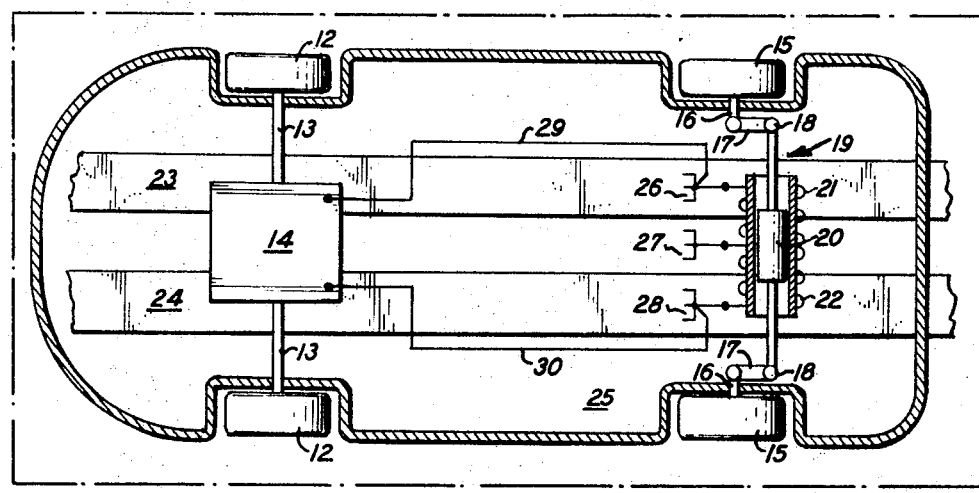
Figure 4:
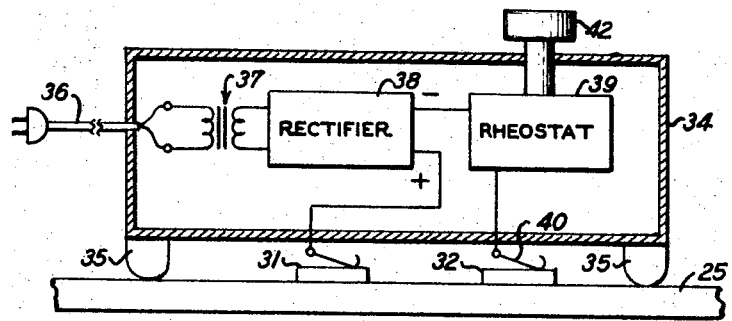
Figure 3:
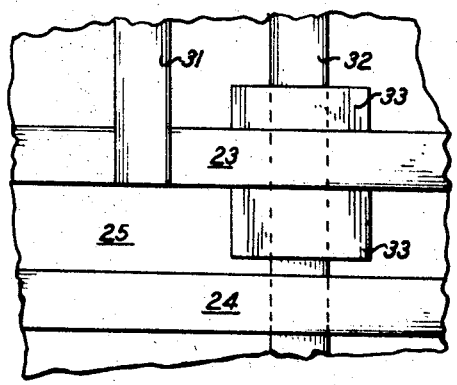
Figure 6:
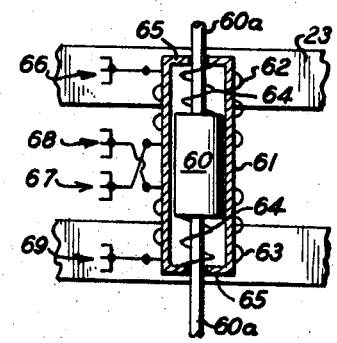

Other objects and advantages will be apparent to those skilled in the art after reading the following description in connection with the annexed drawings, in which FIG. 1 is a side elevation of a preferred form of miniature vehicle constructed in accordance with this invention with the supporting surface shown in cross section FIG. 2 is a horizontal cross section taken on the line 2–2 of FIG. 1; FIG. 3 is a fragmentary view of an arrangement for supplying electrical power to the track system shown in FIGS. 1 and 2; FIG. 4 is a view in elevation of a power supply means for employment with the arrangement of FIG. 2 with a schematic diagram for the circuit connections to the track leads; FIG. 5 is a schematic plan view of one type of switching means for the track system shown in the previous FIGS., and; FIG. 6 is a schematic fragmentary plan view of a modified form of steering mechanism.

In the drawings, the numeral 10 indicates generally a miniature vehicle which may have a body 11 formed of plastic or metal to simulate a conventional automobile or racing car, having a pair of wheels 12 connected to the ends of a common shaft 13, rotatably attached to the rear portion of the body by conventional mountings (not shown), which shaft may also form the armature shaft of a small AC and/or DC electric motor 14 suitable for turning the wheels to propel the vehicle at speeds simulating high speed movement. The vehicle may also have another pair of wheels 15 rotatably mounted on stub shafts 16 which are themselves supported at the front end of the body in conventional bearings (not shown) to permit pivotal movement about substantially vertical spaced parallel axes and to provide steering control of the vehicle. Each of the stub shafts includes an arm 17 projecting at right angles to the axis of pivotal movement, the free ends of these arms being pivotally joined with the opposite ends 18 of an elongated steering control rod means indicated generally by numeral 19. A medial portion 20 of the control rod means may comprise the linearly movable armature element of an electric solenoid means having field coils 20 and 22 affixed to the body 11. These coils are arranged to surround the armature portion 20 in coaxial alignment, and the armature itself is preferably formed as a cylindrical block of ferromagnetic material, such as soft iron, so that energization of the coils 21 and/or 22 will induce movement of the armature to affect control of the steerable wheels 15, while the remainder of the control rod 18 could be made of plastic, or a nonferrous metal such as brass or aluminum.

The coils 21 and 22 are energized from a track system which may comprise a pair of electrically conductive parallel strips 23 and 24 which, in a preferred form can be formed of metal foil adhesively secured to any suitable supporting surface 25 such as a table, or even the floor of a building. The track could also be fabricated by depositing an electrically conductive coating of metallic particles upon a nonconductive surface by means of a spray, brush or other method.

An electrical connection between the vehicle and the track system is provided by means of a set of three flexible brushes 26, 27 and 29, the upper ends of which are attached by any suitable means to the underside of the body 11. Contact 26 is connected with the outside lead for coil 21 and contact 28 is connected to the outside lead of the opposite coil 22, while contact 27 is joined with a common lead to the inside end of both coils. Contacts 26 and 28 can also be employed to supply current for operation of driving motor 14 by means of leads 29 and 30.

In operation, electricity may be supplied to the conductive strips 23 and 24 by any conventional means such as a step-down transformer connected with the usual commercial outlet. The speed of the vehicle may be regulated by controlling the voltage by means of a rheostat, of the potential supplied to motor 14 by the brushes 26 and 28 while steering will be controlled by the lateral positions of the respective brushes 26, 27 and 28 as the vehicle moves across the supporting surface. For this purpose, it should be noted that the spacing between the strips 23 and 24 is approximately equal to the spacing between the outside brushes 26 and 28 and, therefore so long as the vehicle is following the track defined by the strips, a current will flow in series through both coils 21 and 22. If the coils are wound in opposite directions, the net effect of the combined magnetic field developed by the coils is to cause the armature 22 to remain in a central position or, if not in that position, to seek the central position and thus hold the steerable wheels 15 in the position to guide the vehicle in a straight ahead direction. In this connection, it should be noted that even if the coils are both wound in the same direction, particularly if the armature is made longer than the total length of the coils, the effect of current flowing will keep the wheels in a straight ahead direction. In this condition the center brush 27 is in engagement with the area of the surface 25 between the strips and can thus have no effect on the coils 21 and 22. However, if the vehicle should stray towards one side or the other or, if the vehicle encounters a curve the middle brush will encounter one or the other of the strips. If it should come into contact with strip 23 the coil 21 will be either shorted out if brush 26 is still in contact, or coil 21 will be deenergized if the brush 26 moves away from the strip entirely. In either event, the magnetic field of coil 21 is destroyed while the field of coil 22 will still be energized by the circuit completed through contact between brush 27 and strip 23 and the resultant unbalanced field will pull armature 22 towards strip 24, causing wheels 15 to turn in that direction. As soon as the direction of the vehicle has thus been corrected, brush 27 will again return to a position between the strips and a state of equilibrium will be reestablished between coils 21 and 22 to maintain straight ahead steering control. Obviously, if the direction of the strips is in the opposite direction, or the vehicle veers to the right, the brush 27 will contact strip 24 to deenergize coil 22 to turn the wheels 15 to the left until equilibrium is restored. Needless to say, while the steering will be controlled by the solenoid, the brushes 26 and 28 will be furnishing electricity to the driving motor 14 the speed of which may be controlled by a rheostat or other means to be described and, if the speed of the motor is proportional to the voltage supplied, it will be obvious that the greater the speed, the greater will be the corrective response of the solenoid steering means. In addition, in order to avoid overcorrection, a dash pot means can be associated with the steering mechanism such as by the addition of a small air piston; or, a pair of light springs could be attached for urging the wheels towards a straight ahead position in the absence of an unbalanced magnetic field.

As previously stated the track system may preferably comprise a pair of strips of conductive metal foil 23 and 24 which can be adhesively secured to any suitable supporting surface and laid out to form any desired pattern of operation including switches and crossovers. Also, the strips may be applied by any other means such as by coating the surface with metal particles to form the track system and, quite obviously, the strips could include embedded metal bars.

A preferred arrangement for supplying electricity to the track system is shown in FIG. 3 in which case the two strips 23 and 24, forming the track system, are to be energized from a remote source. In this case a pair of leads 31 and 32, lying generally at right angles to the main track laid on the surface 25 prior to the placement of strips 23 and 24. The leads 31 and 32 can also comprise metal foil or can be deposited in the same way as the track strips and lead 31 will pass below strip 23 and be electrically connected with it. Similarly, lead strip 32 will also pass under both strips 23 and 24 to be electrically connected with strip 24. In addition, before track 23 is laid down, a small sheet, or coating 33, of electrically nonconductive material is placed between lead strip 32 and track strip 23 to insulate the two from each other. Incidentally, while the two leads strips are shown as being laid below the two tracks, it will be apparent that, in an emergency, they could be laid on top, but this arrangement will expose the lead strips to the action of the wheels and brushes of the vehicles and the likelihood of their being pulled from the surface by wear and tear.

In FIG. 4 there is shown a preferred form of portable power supply for operating the system, which includes an enclosure, indicated generally by numeral 34, having supporting feet 35 to rest on the surface 25. The electrical system includes a line cord 36 leading to the primary of a stepdown transformer 37 contained within the enclosure. The output of the transformer is fed to a conventional rectifier 38 and one of the output leads from the rectifier is fed through a rheostat 39 to one of a pair of spring contacts 40 attached to the bottom of the enclosure 34; the other spring contact 41 being connected directly to the other output from the rectifier. Rheostat 39 is provided with a control knob 42 projecting outside the enclosure. The two contacts 40 and 41 are arranged so that they are spaced to coincide with the spacing of the lead strips 31 and 32 and they project downwardly a sufficient amount such that they will establish an electrical connection with the strips at any location along their length whenever the enclosure 34 is put down on the surface 25. While the control device is shown as providing DC current, which provides a more efficient operation of the steering system, the solenoid means can be operated on AC in which case the rectifier 38 can be eliminated.

A completely self-contained and self-powered switching system for the vehicle of the present invention is shown schematically in FIG. 5, wherein numerals 43 and 44 may indicate conductive strips comprising a portion of a main line track system which leads into two diverging subdivisions, indicated generally by numerals 45 and 46, wherein a continuation 43a of strip 43 forms one of the strips of subdivision 45 and the continuation 44a of strip 44 forms the opposite one of the strips of subdivision 46, while strips 47 and 48 are provided to constitute the respective companion track strips for the subdivisions. Power is supplied to these additional new strips from the main lines, as indicated schematically by lead 49 which connects strip 43a with strip 48, and lead 50 connecting strip 44a with strip 47. Obviously, these connections can be made in the same manner as the connections disclosed in FIG. 3 in connection with supplying current to strips such as 43 and 44. Lead 49 also connects with the fixed contact 51 of a single-pole contact switch 52, while lead 50 is connected with the fixed contact 53 of another single-pole single contact switch 54; these two switches being ganged together to operate for alternatively opening one circuit and simultaneously closing the other circuit. Switches 52 and 54 are respectively connected to two conductive strip stub sections 55 and 56 laid on the surface 25 at the respective junctions of the main line and subdivisions 45 and 46 and generally between strips 43a and 47 on the one hand, and strips 48 and 44a on the other hand.

As shown in FIG. 5, stub 55 is energized from the current supplied to strips 43a and 48 when the switches 52 and 54 are in the positions shown, and; no current is supplied to stub 56. Thus, if the vehicle 10 is approaching the junction along the strips 43 and 44, a position will be reached at which the stub 55 acts as a lateral extension of strip 43 and 43a so that if the vehicle continues in a straight direction the middle brush 27 will contact the energized stub 55, causing the vehicle to steer to the right towards the subdivision 46. Since no energy is applied to stub 56, no nullifying energy will be transmitted to the middle brush unless the vehicle should veer so far to the right that the brush 27 would come in contact with strip 44a. Once the vehicle has passed the junction, the strip 48 serves in the place of strip 43 to energize the middle brush, in cooperation with strip 44a, for guiding the vehicle along the path defined by these two strips. By analogy, if the ganged switched 52 and 54 are moved to the other position to connect stub 56 with strips 47 and 44a, and disconnect stub 55, the vehicle would be guided to the left, along subdivision 45 it reaches the junction and would continue along the path defined by strips 43a and 47.

In FIG. 6 there is shown a modified form of steering device which is characterized by the fact that no current is drawn by the mechanism during straight ahead driving, the wheels being normally positioned by coil spring means.

In this FIG., numeral 60 indicates a ferromagnetic armature, having opposite extending arms 60a, connected respectively to the steering arms 18 of the wheels of the vehicle, as shown in FIG. 2. In this case, the armature is surrounded by a core 61 having two separate windings 62 and 63. The armature is also provided with biassing means for urging it towards the center position in the absence of any energization of the coils and, while other arrangements may be used, one such biassing means may comprise a pair of light coil compression springs 64, one of their ends bearing against opposite ends of the armature, their other ends being restrained by means such as a pair of end walls 65 attached to opposite ends of the core 61. The coils are energized by means of four brushes 66, 67, 68 and 69, similar to the brushes 26—28 of FIGS. 1 and 2, attached to the under side of the body 11. Brushes 66 and 67 are connected to energize winding 62, while winding 63 is connected with brushes 68 and 69. Thus, as long as the vehicle is following the track defined by strips 23 and 24, no current flows in the coils and the springs 64 hold the wheels in the straight ahead position. However, if the vehicle moves to the right, brush 67 will contact strip 24 while 66 is still in contact with strip 23, energizing winding 62 and pulling armature towards the left (upwardly in FIG. 6, assuming the vehicle is moving to the right), causing the wheels to turn to the left until the vehicle is recentered on the track. Conversely, movement of the vehicle toward the left will energize winding 63, through brushes 68 and 69 causing movement of the vehicle to the right. Obviously, the vehicle will also follow any changes in direction of strips 23 and 24 and will operate with the switching arrangement of FIG. 5 in the same way as described previously in connection with the arrangement of FIG. 2.

The modified form of steering mechanism shown in FIG. 6 has the advantage that only when the vehicle does stray off course, or is directed into a turn, is current drawn by the steering mechanism, making it particularly suitable for battery operation. It also has the advantage that, when the steering mechanism is energized to alter the course of the vehicle there is a voltage drop across the driving motor, due to the current drain in the solenoid coil, which reduces the speed of the vehicle concurrently with the change of direction. Of course, a skilled operator can maintain the speed of the vehicle, if desired, by manipulating the rheostat of the power supply to neutralize, or offset, the additional current drain.

Having disclosed several forms in which the invention may be practiced, it will be apparent that various modifications and improvements may be made which would come within the scope of the annexed claims.

I claim:

1. A system for operating electrically propelled miniature vehicles along a predetermined path defined by a pair of generally coextensive parallel spaced electrically conductive strips disposed on a generally nonconductive supporting surface, said vehicles including a body provided with at least one surface engaging steering wheel turnable about a generally vertical axis for guiding the direction of movement of the vehicle, biassing means to urge said steering wheel toward a predetermined position to move the vehicle in a predetermined direction, electromagnetic means for actuating said steering wheel including solenoid coil means and armature means linearly reciprocably movable in response to shiftable magnetic fields produced by said solenoid coil means for reciprocably turning said steering wheel, said electromagnetic means also including brush means attached to said body for operative engagement with said conductive strips while the vehicle is moving and circuit means connecting the electromagnetic means and brush means for establishing a first magnetic field in said solenoid coil means when said vehicle is laterally displaced in one direction with respect to said conductive strips to urge said armature means to turn the steering wheel to guide the vehicle toward a position astride said conductive strips, and means for supplying electrical energy to said conductive strips.

2. The invention defined in claim 1, wherein said biassing means includes circuit means for establishing a second magnetic field.

3. The invention defined in claim 1, wherein said circuit means includes means for establishing a third magnetic field in said solenoid coil means when said vehicle is laterally displaced with respect to said conductive strips in a direction opposite to said one direction to urge said armature means to turn the steering wheel to guide the vehicle to a position astride said conductive strips.

4. The invention defined in claim 1, wherein said body also includes at least one ground-engaging wheel for propelling the vehicle, electric motor means for driving said propelling wheel, and said circuit means includes means for connecting the electric motor means with the brush means.

5. The invention defined in claim 4, wherein said body also includes at least two steering wheels each turnable about generally vertical spaced axes, tie rod means connecting said two steering wheels for turning them in unison, said tie rod means including said armature means.

6. The invention defined in claim 5, wherein said solenoid coil means surrounds said armature means and is transversely horizontally disposed on said body.

7. The invention defined in claim 1, wherein said brush means includes at least two downwardly extending flexible contact members arranged for electrical contact between one of said members and one of the conductive strips when the vehicle is astride the pair of conductive strips, the second of said two flexible members being arranged for electrical contact with a conductive strip only when the vehicle is laterally displaced.

8. The invention defined in claim 7, wherein said brush means also includes a third downwardly extending flexible contact member arranged for electrical contact with the other of the conductive strips when the vehicle is astride the pair of conductive strips.

9. The invention defined in claim 7, wherein said armature means includes an elongated ferromagnetic element, said solenoid coil means includes a winding arranged coaxially with said element, and said circuit means includes a first connection between said one contact member and one end of said winding and a second connection between said second member and a point in said winding electrically remote from said one end for exerting force on the ferromagnetic element in one direction, and means for exerting force for urging movement of said element in the opposite direction.

10. The invention defined in claim 9, wherein said means for exerting force for urging movement of the ferromagnetic element in said opposite direction includes a third downwardly extending flexible contact member arranged for electrical contact with the other of the conductive strips and circuit means connecting said third member with the other end of said winding, said second member being connected with said winding at a point electrically remote from both ends thereof.

11. The invention defined in claim 10, wherein said winding includes two coaxially aligned portions, said portions when energized establishing two opposed approximately equal magnetic forces.

12. The invention defined in claim 11, wherein one of said two portions of said winding is connected in circuit with said first and second flexible contact members, the other portion of the winding being connected in circuit with said second and third flexible contact members.

13. The invention defined in claim 1, wherein said electrically conductive strips include metallic material bonded with said supporting surface.

14. The invention defined in claim 13, wherein said metallic material includes metal particles deposited on said surface.

15. The invention defined in claim 13, wherein said metallic material includes metal foil adhesively secured to said surface.

16. The invention defined in claim 15, wherein said means for supplying electrical energy to said conductive strips includes another pair of metal foil strips respectively electrically connected with the first pair of strips and extending on said surface angularly away from said first pair, one of said another pair of strips being separated from one of the first pair of strips by a layer of insulating material.

17. The invention defined in claim 1, wherein said means for supplying electrical energy to said conductive strips includes enclosure means for a power supply means, said supply means including line cord input means and output supply contact means, said latter contact means comprising flexible contact members mounted for projecting downwardly from said enclosure means for electrical engagement with spaced metallic elements on a supporting surface.

18. The invention defined in claim 17, wherein said enclosure means is provided with a plurality of supporting feet, and said flexible contact members normally project below the bottom plane of said feet.

19. The invention defined in claim 1, wherein said spaced conductive strips are arranged to define a main path and at least one subsidiary path diverging from said main path, and circuit second means including at least one conductive area on said supporting surface spaced from said first-mentioned conductive strips for selectively energizing said electromagnetic means on a vehicle for guiding said vehicle into a predetermined subsidiary path.

20. The invention defined in claim 19, wherein said one conductive area is positioned between said pair of conductive strips adjacent the juncture of said main and subsidiary paths.

21. The invention defined in claim 20, wherein said subsidiary path is defined by a continuation of one of the conductive strips of the main path and by another conductive strip arranged parallel with the continuation of said one of the conductive strips and insulated therefrom, said another strip terminating at one end at the juncture of said paths, said second circuit means including means for electrically connecting said another strip with the other of the conductive strips of the main path and for electrically connecting said conductive area with one of said conductive strips.

22. The invention defined in claim 21, wherein said second circuit means includes switching means for selectively disconnecting said conductive area from any of said conductive strips.

23. The invention defined in claim 22, wherein a conductive area is provided for each path defined by pairs of generally parallel conductive strips, said areas being disposed at the juncture of said paths, said second circuit means including switching means for selectively electrically connecting any one of said areas with one of the conductive strips.

24. The invention defined in claim 23, wherein said switching means includes means for simultaneously disconnecting one conductive area when another conductive area is electrically connected with a conductive strip.

25. The invention defined in claim 1, wherein said biassing means includes mechanical spring means connected with said means for actuating the steering wheel to urge the steering wheel towards said predetermined position in the absence of said first magnetic field.

26. The invention defined in claim 25, wherein said mechanical spring means is connected to urge the steering wheel towards a position to maintain the vehicle in said predetermined direction, and said circuit means includes means for establishing a second magnetic field in said solenoid coil means when the vehicle is laterally displaced in a direction opposite to said one direction with respect to the conductive strips to urge said armature means to turn the steering wheel to guide the vehicle toward a position astride said conductive strips.

27. The invention defined in claim 26, wherein said solenoid coil means includes two axially aligned windings and a pair of brushes for energizing each of said windings, said brushes being attached to vehicle for contact with a supporting surface and being positioned for contact of one of said pair of brushes with said conductive strips to energize one of said windings only when the vehicle is displaced to one side with respect to the conductive strips and to energize the other of said windings when the vehicle is displaced to the other side with respect to the strips.

28. The invention defined in claim 27, wherein said brushes are positioned in transverse spaced alignment whereby one brush of each of said pairs is in contact with a respective one of the conductive strips substantially in all lateral positions of the vehicle, the remaining brush of one pair being positioned for contact with the respective other conductive strip only when the vehicle is laterally displaced in one direction, the remaining brush of the other pair being positioned for contact with the respective other conductive strip only when the vehicle is laterally displaced in the other direction, whereby said windings are selectively energized only when the vehicle is laterally displaced.

29. The invention defined in claim 1, wherein said brush means is positioned for operative engagement with the conductive strips for establishing said magnetic field only when the said predetermined direction of movement of the vehicle deviates laterally from the direction of the path defined by the conductive strips.

30. The invention defined in claim 29, wherein said circuit means includes electric motor means for propelling said vehicle and means connecting said electric motor means and brush means, whereby when said magnetic field is established in the solenoid coil means, the effective power of the motor means is correspondingly reduced.